United States Patent
Sexton et al.

(10) Patent No.: US 8,092,888 B2
(45) Date of Patent: Jan. 10, 2012

(54) NOISE REDUCTION LAYER FOR OPTICAL DATA STORAGE MEDIA

(75) Inventors: Joseph H. Sexton, Oakdale, MN (US);
Richard F. Willson, Hudson, WI (US)

(73) Assignee: Imation Corp., Oakdale, MN (US)

( * ) Notice: Subject to any disclaimer, the term of this patent is extended or adjusted under 35 U.S.C. 154(b) by 785 days.

(21) Appl. No.: 12/079,120

(22) Filed: Mar. 25, 2008

(65) Prior Publication Data
US 2009/0246442 A1    Oct. 1, 2009

(51) Int. Cl.
*B32B 3/02* (2006.01)
(52) U.S. Cl. .................. 428/64.1; 428/64.4; 430/270.12
(58) Field of Classification Search .................. 428/64.4; 430/270.12
See application file for complete search history.

(56) References Cited

U.S. PATENT DOCUMENTS

| 6,607,845 B2 * | 8/2003 | Hirai et al. ..................... 428/641 |
| 6,731,590 B1 * | 5/2004 | Shingai et al. ................ 369/286 |
| 2004/0191683 A1 * | 9/2004 | Nishihara et al. ........ 430/270.11 |

* cited by examiner

*Primary Examiner* — Elizabeth Mulvaney
(74) *Attorney, Agent, or Firm* — Shumaker & Sieffert, P.A.

(57) ABSTRACT

An optical data storage disk including a substrate, a nanocrystalline noise reduction layer formed over the substrate, a reflector formed directly on the noise reduction layer and a cover layer formed over the reflector layer. An optical source detects data from the disk through the cover layer. In some embodiments, the reflector layer forms part of a multilayer recording stack and the cover layer is formed over the multilayer recording stack. In some embodiments, the noise reduction layer includes one or more components selected from the group consisting of Ti, Ti alloys, Ti oxides, Cr, Cr alloys and Cr oxides. Additionally, a method of forming an optical data storage disk that includes a nanocrystalline noise reduction layer.

21 Claims, 7 Drawing Sheets

NOISE REDUCTION LAYER FOR OPTICAL DATA STORAGE MEDIA

TECHNICAL FIELD

The invention relates to optical storage media and, more specifically, to a noise reduction layer for a blue laser optical disk.

BACKGROUND

Optical data storage disks have gained widespread acceptance for the storage, distribution and retrieval of large volumes of information. Optical data storage disks include, for example, audio CD (compact disc), CD-R(CD-recordable), CD-RW (CD-rewritable) CD-ROM (CD-read only memory), DVD (digital versatile disk or digital video disk), DVD-RAM (DVD-random access memory), and various other types of writable or rewriteable media, such as magneto-optical (MO) disks, phase change optical disks, and others. Some newer formats for optical data storage disks are progressing toward smaller disk sizes and increased data storage density. For example, some new media formats boast improved track pitches and increased storage density using blue-wavelength lasers for data readout and/or data recording.

Optical data storage disks are typically produced by first making a data storage disk master that has a surface relief pattern that represents encoded data or tracking control information on the master surface. The surface relief pattern, for instance, may be a collection of grooves or pits and lands, typically arranged in either a spiral or concentric manner. The master is typically not suitable as a mass replication surface with the master features defined within an etched photoresist layer formed over a master substrate.

After creating a suitable master, that master can be used to make a replica or a stamper, which is less fragile than the master. The stamper is typically formed of electroplated metal, and has a surface relief pattern that is the inverse of the surface relief pattern encoded on the master. If the master is originally defined to have an inverse of a desired replica pattern, the master may be used to create a first generation hard plastic replica, which is in turn used to create a second generation electroplated metal stamper that can be used to create the replica disks. An injection mold can use the electroplated metal stamper to replicate large quantities of disks. Also, photopolymer replication processes, such as rolling bead processes, have been used to replicate disks using stampers. In any case, each replica disk may contain the data and tracking information that was originally encoded on the master surface and preserved in the stamper. The replica disks can be coated with a reflective layer and/or a phase change layer, and are often sealed with an additional protective layer.

Blue disk media formats, such as Blu-Ray and High Definition Digital Versatile Disk (HD-DVD), may also use similar mastering-stamping techniques. The blue disk media formats may be compatible with a blue-laser drive head that operates at a wavelength of approximately 405 nm. As used herein, the term blue disk media (or blue disks) refers to optical disk media having a data storage capacity of greater than 15 gigabytes (GB) per data storage layer of the disk. The blue disk media formats include optically transmissive cover layers bonded over the optical disk with different thicknesses specified by the different blue disk media formats.

SUMMARY

In general, the disclosure is directed to a noise reduction layer for a blue disk media format. The noise reduction layer may be formed over a substrate, and a reflector may be formed directly on the noise reduction layer. In some embodiments, the noise reduction layer may reduce written or pre-recorded (e.g., ROM) jitter, may reduce the noise in the wobble signal, and may improve the tracking and positioning of a read beam compared to an optical disk in which the reflector is formed directly on the substrate.

In one aspect, the present disclosure is directed to an optical data storage disk. The optical data storage disk includes a substrate, a nanocrystalline noise reduction layer formed over the substrate, a reflector layer formed directly on the noise reduction layer and a cover layer formed over the reflector layer. An optical source detects data from the disk through the cover layer.

In some embodiments, the reflector layer forms part of a multilayer recording stack, the cover layer is formed over the multilayer recording stack, and the optical source records data onto and detects data from the disk through the cover layer.

In another aspect, the present disclosure is directed to an optical data storage disk. The optical data storage disk includes a substrate, a nanocrystalline noise reduction layer formed over the substrate, a multilayer recording stack formed over the noise reduction layer, and a cover layer formed over the multilayer optical stack. The noise reduction layer includes one or more components selected from the group consisting of Ti, Ti alloys, Ti oxides, Cr, Cr alloys and Cr oxides. The multilayer recording stack includes a reflector layer that is formed directly on the noise reduction layer. An optical source records data onto and detects data from the disk through the cover layer.

In yet another aspect, the present disclosure is directed to a method of forming an optical data storage disk. The method includes forming a nanocrystalline noise reduction layer over a substrate, forming a reflector layer directly on the noise reduction layer and forming a cover layer over the reflector layer.

In some embodiments, forming a reflector layer includes forming a multilayer recording stack over the nanocrystalline noise reduction layer, the multilayer recording stack includes a reflector layer, and the reflector layer is formed directly on the nanocrystalline noise reduction layer.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
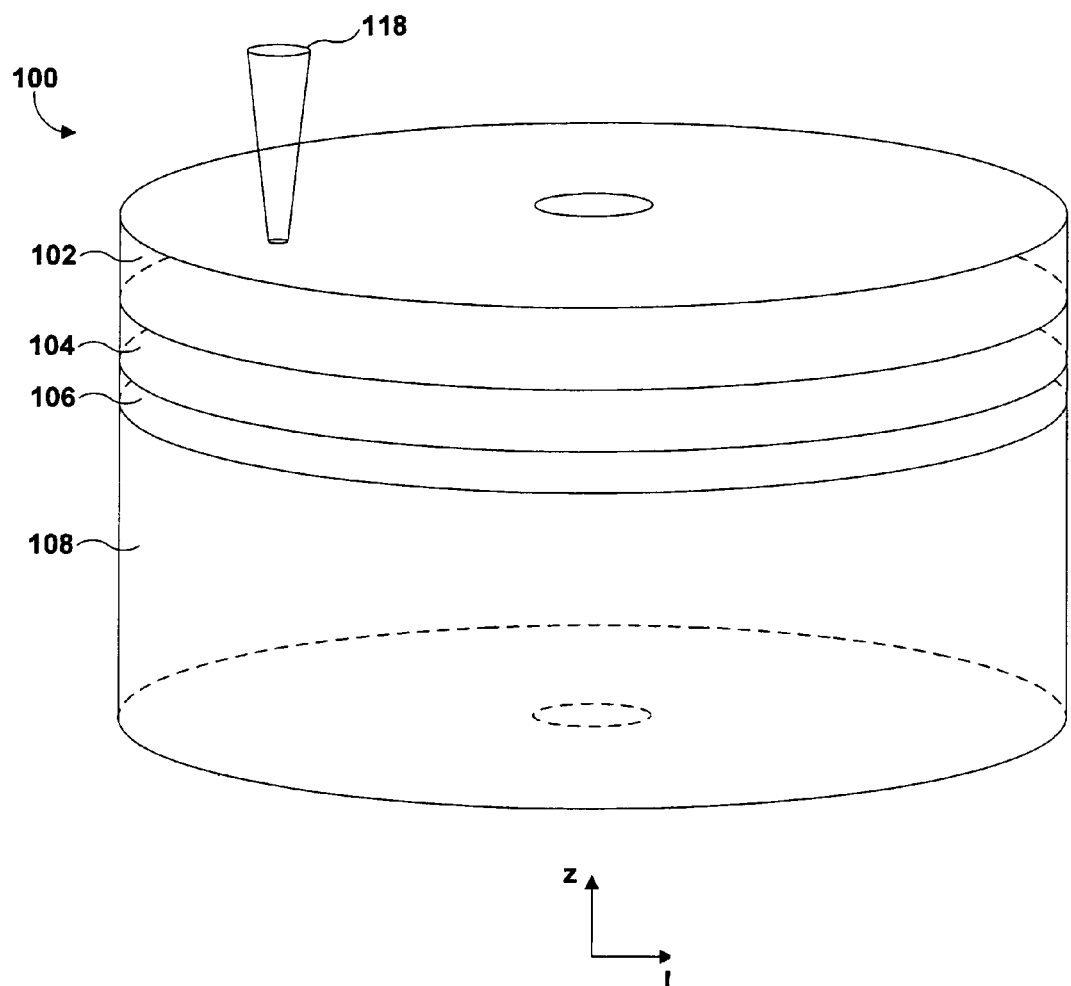
FIG. 1 is an exploded perspective view of an optical data storage disk.

FIG. 1 is an exploded perspective view of an exemplary optical data storage disk 100. Optical data storage disk 100 includes a number of layers, each of which contributes to the function of disk 100. Optical data storage disk 100 may comprise a blue laser disk medium, i.e., an optical disk medium compatible with a blue-laser drive head. The blue-laser drive head may operate at a wavelength of approximately 405 nm. As used herein, the term blue disk media (or blue disks) refers to optical disk media having a data storage capacity of greater than 15 gigabyte (GB) per data storage layer of the disk. Examples of blue disk media include Blu-Ray and HD-DVD, although the disk constructions described herein may only be applicable to Blu-Ray or similar type disk constructions.

Optical data storage disk 100 includes a substrate 108. Substrate 108 provides mechanical support for optical data storage disk 100 and may generally be the thickest layer of disk 100. Substrate 108 may comprise a relatively rigid polymeric material, such as, for example, polycarbonate with a thickness of approximately 1.1 mm. Substrate 108 may include a surface 108a that comprises a plurality of concentric or spirally-wound tracks formed by molding substrate 108 against a stamper inside an injection mold. Further details regarding the tracks will be described below with reference to FIG. 2.

Optical data storage disk 100 also includes a noise reduction layer 106 formed over substrate 108, a multilayer recording stack 104 formed over noise reduction layer 106, and a cover layer 102 formed over multilayer recording stack 104. As used herein, "formed over" is defined as a layer that is formed on top of another layer, and encompasses both a first layer formed immediately adjacent a second layer and a first layer formed on top of a second layer with one or more intermediate layer present between the first and second layers. In contrast, "formed directly on" denotes a layer that is formed immediately adjacent another layer, i.e., there are no intermediate layers.

Noise reduction layer 106 may be formed over substrate 108, with multilayer recording stack 104 formed over, or formed directly on, noise reduction layer 106. As described in further detail below, the composition and construction of noise reduction layer 106 may result in a smoother and denser reflector within stack 104 than can be achieved without such a layer, which may lead to at least one of reduced jitter, an increased wobble signal-to-noise ratio, and improved tracking and positioning performance.

Optical data storage disk 100 also includes a cover layer 102 formed over multilayer recording stack 104. Cover layer 102 may form a protective coating for multilayer recording stack 104 to protect stack 104 from scratches, fingerprints or other damage. As such, it is desirable that cover layer comprises a hard and damage-resistant material.

Additionally, as shown in FIG. 1, a beam 118, such as, for example, a laser with a wavelength of approximately 405 nm, is focused through cover layer 102 into multilayer recording stack 104 to record data to, or detect data stored in, optical data storage disk 100. An optical data storage disk 100 configured in this way may be referred to as an air incident disk. That is, the beam 118 is not incident on disk 100 through substrate 108, but through cover layer 102. One exemplary type of optical data storage disk 100 that is air incident includes Blu-Ray disks. Because of this, the optical properties of cover layer 102, including, for example, refractive index, optical thickness, optical clarity and the like are also important. For example, in the Blu-Ray disk specification, the thickness of the cover layer is approximately 100 microns, with a thickness uniformity within ±2 microns.

To meet both the requirements of durability and optical properties, in some embodiments, the cover layer 102 may comprise, for example, a preformed polycarbonate or polyvinyl chloride (PVC) layer bonded to multilayer recording stack 104. In other embodiments, the cover layer 102 may comprise a curable resin, such as, for example, an acrylic resin.

In other embodiments, the cover layer 102 may be formed in multiple refractive index-matched layers to, for example, improve manufacturability or to provide desired durability and optical properties. As one example, the cover layer may comprise an optically transmissive layer, a first layer of material disposed over a first surface of the optically transmissive layer, and a second layer of material disposed over a second surface of the optically transmissive layer. In one embodiment, the first layer of material may comprise a hardcoat resistant to fingerprints and scratches, and the second layer may comprise a bonding layer to bond the cover layer 102 to multilayer recording stack 104.

Figure 2:
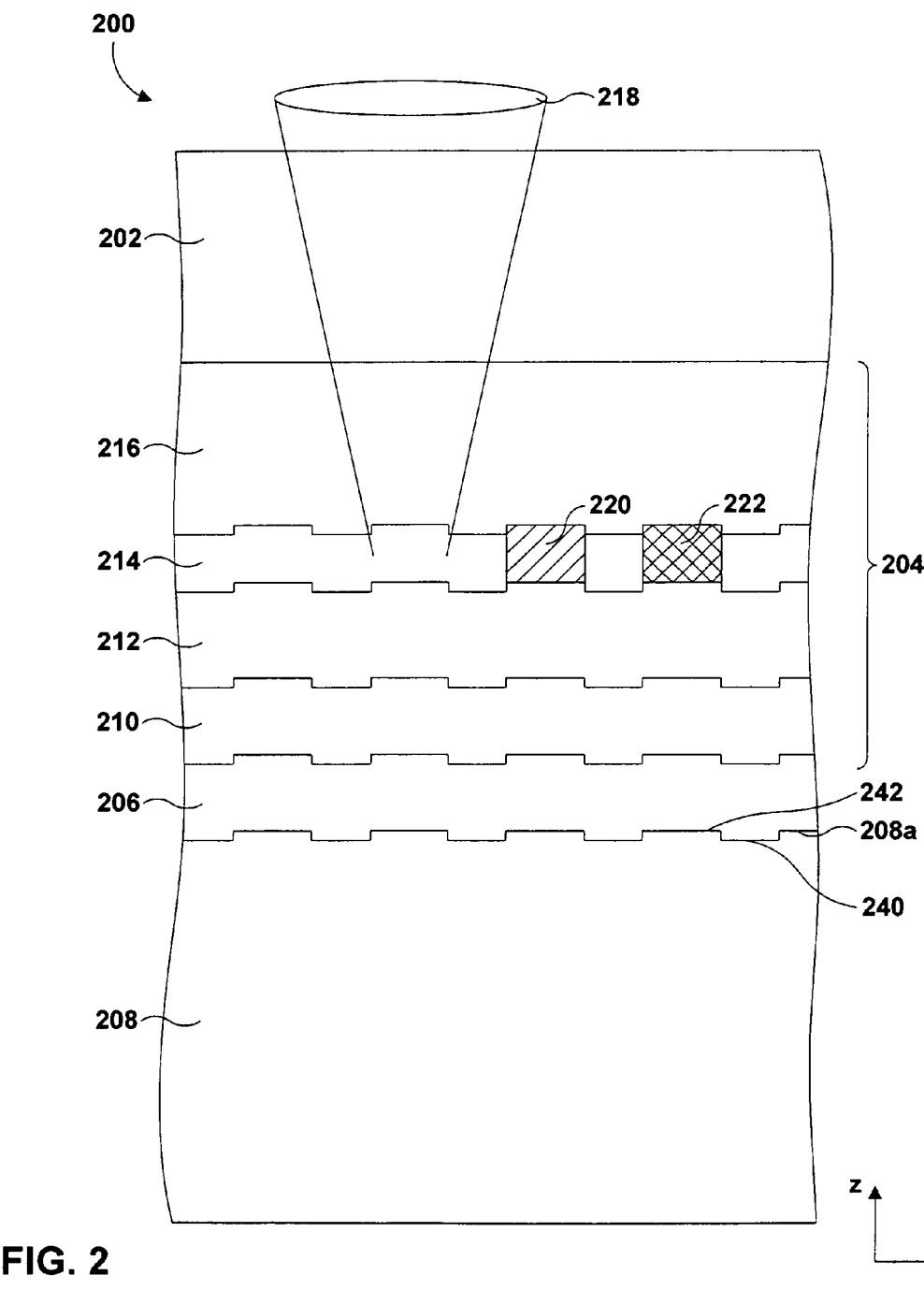
FIG. 2 is a conceptual cross-sectional view of an optical data storage disk.

FIG. 2 is a conceptual cross-sectional view of another embodiment of an optical data storage disk 200. The embodiment shown in FIG. 2 includes one example configuration of the sub-layers of multilayer recording stack 204. In the illustrated embodiment of FIG. 2, the optical recording stack includes a reflector 210 formed directly on noise reduction layer 206, a first dielectric layer 212 formed over reflector 210, a recording layer 214 formed over first dielectric layer 212 and a second dielectric layer 216 formed over recording layer 214.

Substrate 208 provides mechanical support for optical data storage disk 200 and may generally be the thickest layer of disk 200. Substrate 208 may comprise a relatively rigid polymeric material, such as, for example, polycarbonate. Substrate 208 may comprise a variety of thicknesses depending on the standard to which disk 200 conforms. In one embodiment, disk 200 conforms to the Blu-Ray disk standard, and substrate 208 comprises a thickness of approximately 1.1 mm.

As shown in FIG. 2, substrate 208 may be formed with a plurality of tracks including land areas 242 and grooves 240 in surface 208a. The land areas 242 and grooves 240 provide useful features which a tracking servo may utilize for positioning beam 218. For example, by monitoring a reflection of beam 218 off multilayer recording stack 204 of data disk 200, the push-pull signal and the push-pull variability may be determined. The push-pull signal is used by the tracking servo to position the beam 218 on the track being written or read. The push-pull variability is used to indicate the quality of the push-pull signal and the ability to achieve satisfactory beam positioning. Ideally, the push-pull variability is zero when the beam 218 is reading or writing on a track. Also, by monitoring the reflection of beam 218 off stack 204 of data disk 200, the wobble signal can be measured and used to determine, for example, timing and speed information. The wobble signal-to-noise can be used as a measure of the quality of the wobble signal. Preferably the wobble noise is low and the wobble signal-to-noise is high. As is seen in FIG. 2, the shape and smoothness of each of noise reduction layer 206 and the layers of multilayer recording stack 204 ideally replicate the shapes and smoothness of land areas 242 and grooves 240. However, in many embodiments, the layers formed over substrate 208 may introduce deviations from the geometry of the grooves 240 and land areas 242 in surface 208a, as well as introduce increased roughness, both of which may negatively affect the performance of the tracking servo mechanism, data detection or both.

In some embodiments, serving the position of beam 218 may include, for example, measuring a push-pull signal. The push-pull signal may be determined by changes in the diffracted light intensity as beam 218 travels over the transitions between grooves 240 and land areas 242. The push-pull signal is created by measuring a reflection of beam 218 using a sensor divided into at least two sections that sense the intensities of different diffracted orders. Because the diffracted order intensities in the reflection of beam 218 off multilayer recording stack 204 are very sensitive to the integrity of the transition from grooves 240 to land areas 242, it is desirable that the transition from grooves 240 to land areas 242 has minimal short range or long range undulations, and that the structure of grooves 240 and land areas 242 are accurately replicated in reflector 210 and the other layers of multilayer recording stack 204. Further, because the beam 218 travels through cover layer 202 and multilayer recording stack 204 before reflecting off reflector 210, any imperfections in cover layer 202 or stack 204 may result in a poor quality push-pull signal and impaired tracking capability.

Reflector 210 is formed over noise reduction layer 206. In some embodiments, reflector 210 is formed directly on noise reduction layer 206. Reflector 210, for example, may be designed to reflect substantially all incident light (e.g., beam 118). In other embodiments, however, reflector 210 may be designed to reflect a desired fraction of any incident light. An embodiment including a reflector that is designed to reflect only a certain fraction of the incident light will be described in further detail with reference to FIG. 5.

Reflector 210 may also serve as a heat sink for heat generated in the recording and erasing of data stored on recording layer 214. For example, in some embodiments, reflector 210 may comprise a material with a relatively high thermal conductivity. In embodiments such as these, reflector 210 may dissipate heat radially and/or azimuthally throughout reflector 210, thus lessening the temperature increase at any one location of disk 200.

Reflector 210 may include one or more optically reflective materials. For example, in some embodiments, reflector 210 may be formed of silver, aluminum, alloys of silver or aluminum, or the like. In some preferred embodiments, reflector 210 includes silver or a silver alloy. In some particularly preferred embodiments, reflector 210 may include silver or a silver alloy including a majority of silver.

Reflector 210 may include a range of thicknesses, but may generally comprise a thickness of approximately 50 nm to approximately 250 nm. In some preferred embodiments, reflector 210 may comprise a thickness of approximately 80 nm to approximately 160 nm. In one particularly preferred embodiment, reflector 210 may comprise a thickness of approximately 120 nm.

First dielectric layer 212 is formed over reflector 210 and may at least partially thermally insulate reflector 210 from recording layer 214. First dielectric layer 212 may also contribute to a desired optical property of optical data storage disk 200. First dielectric layer 212 may comprise, for example, silicon nitride ($Si_3N_4$), silicon oxide ($SiO_2$), zinc sulfide (ZnS), zirconium oxide ($ZrO_2$), chromium oxide (CrO, $Cr_2O_3$), aluminum nitride (AlN), aluminum oxide ($Al_2O_3$), silicon oxynitride ($SiO_xN_y$) (where x and y are positive real numbers between 0 and 2), or the like. In some embodiments, first dielectric layer 212 may also comprise a mixture of two or more of these components, or may include two or more sub-layers. While first dielectric layer 212 may comprise a range of thicknesses, in some embodiments, first dielectric layer 212 comprises a thickness of approximately 5 nm to approximately 30 nm.

Recording layer 214 is formed over first dielectric layer 212 and is the data storage layer of optical disk 200. In some embodiments, recording layer 214 may comprise a phase change material capable of being rewritten by a suitable optical source (e.g., beam 218). For example, recording layer 214 may store data as amorphous phase areas 220 and crystalline phase areas 222. These amorphous phase areas 220 and crystalline phase areas 222 may be produced by heating discrete volumes of recording layer 214 to a certain temperature and cooling at a certain rate. In one embodiment, for example, a crystalline phase area 222 may be formed by heating a volume of recording layer 214 to a sufficient temperature (e.g., approximately 180° C.) using beam 218 and cooling the volume at a sufficiently slow rate (e.g., cooling over several nanoseconds) to allow the formation of a crystalline structure. Conversely, forming an amorphous phase area 220 in recording layer 214 may be accomplished by heating a volume of recording layer 214 to a sufficient temperature to locally melt the recording layer 214 (e.g., approximately 800° C.) using beam 218 and quickly cooling the volume, which prevents a crystalline structure from forming and results in the amorphous phase.

Data may be recorded in recording layer 214 in positions substantially registered to either land areas 242 or grooves 240 of substrate 208. For example, data stored on tracks substantially registered to land areas 242 may be referred to as on-groove recording. Alternatively, data stored on tracks substantially registered to grooves 240 may be referred to as in-groove recording.

Data that is recorded in recording layer 214 may be detected by passing beam 218 through cover layer 202 at a lower power state than that which would cause a state change of recording layer 214. The crystalline phase areas 222 and amorphous phase areas 220 comprise first and second refractive indices, respectively. The first and second refractive indices result in a first and second reflectivity of reflector 210 at locations corresponding to crystalline phase areas 222 and amorphous phase areas 220, respectively. A sensor detects a fraction of beam 218 that is reflected from a location on disk 200, and correlates this fraction to a crystalline phase area 222 or amorphous phase area 220, and likewise, a value for the data stored at that location in recording layer 214.

Recording layer 214 may comprise a ternary or quaternary alloy that is capable of undergoing a phase transition (e.g., crystalline to amorphous) at a temperature that is compatible with the remaining layers of disk 200 (e.g., the temperatures experienced by recording layer 214 during a write or erase process do not lead to temperatures within the other layers of disk 200 that degrade or destroy these other layers). For example, some polycarbonates have a glass transition temperature ($T_g$) of about 140° C. Thus, it may be desired to limit the temperature experienced by a substrate 208 or cover layer 202 comprising a polycarbonate to below approximately 140° C. The temperature experienced by a layer of disk 200 such as substrate 208 may be influenced by, for example, the thermal conductivities and heat capacities of any layers located between recording layer 214 and substrate 208 (e.g., noise reduction layer 206, reflector 210, first dielectric layer 212), the phase transition temperature(s) of recording layer 214, the power of beam 218, and the like. Some exemplary alloys that comprise desirable phase transition temperatures and/or desirable refractive index changes upon a phase change include, for example, alloys comprising at least one component selected from the group consisting of germanium (Ge), antimony (Sb), tellurium (Te), indium (In), and combinations thereof. One preferred alloy includes GeSbTe, and a particularly preferred alloy includes approximately 4 at. % to approximately 5 at. % Ge, approximately 69 at. % Sb, and the balance Te.

Recording layer 214 may comprise a range of thicknesses, and in some embodiments, recording layer 214 comprises a thickness of approximately 5 nm to approximately 25 nm. In some preferred embodiments, recording layer 214 comprises a thickness of approximately 10 nm to approximately 15 nm.

Second dielectric layer 216 is formed over recording layer 214 and may perform similar functions as first dielectric layer 212. For example, second dielectric layer 216 provides thermal insulation between recording layer 214 and cover layer 202. Further, second dielectric layer 216 aids in producing desired optical properties of disk 200. Second dielectric layer may comprise, for example, silicon nitride ($Si_3N_4$), silicon oxide ($SiO_2$), zinc sulfide (ZnS), zirconium oxide ($ZrO_2$), chromium oxide (CrO, $Cr_2O_3$), aluminum nitride (AlN), aluminum oxide ($Al_2O_3$), silicon oxynitride ($SiO_xN_y$) (where x and y are positive real numbers between 0 and 2), or the like. In some embodiments, second dielectric layer 216 may also comprise a mixture of two or more of these components, or may include two or more sub-layers. In some embodiments, first and second dielectric layers 212 and 216 may comprise the same components, while in other embodiments first and second dielectric layers 212 and 216 may comprise different components. Second dielectric layer 216 may comprise a range of thicknesses, and in some preferred embodiments, may comprise a thickness of approximately 35 nm to approximately 65 nm.

As described briefly above, optical data storage disk 200 comprises a noise reduction layer 206 formed over substrate 208. In some embodiments, noise reduction layer 206 may be formed directly on substrate 208. Noise reduction layer 206 may reduce jitter, increase the signal-to-noise ratio of the wobble signal, and/or improve the tracking performance of beam 218 compared to an optical disk 200 with reflector 210 formed directly on substrate 208.

In conventional optical data storage disks 200, reflector 210 may be formed directly on substrate 208. As described above, reflector 210 may include Ag. Ag is a relatively mobile atom when deposited directly on substrate 208, which may result in congregation of the Ag reflector 210 into islands on substrate 208 during an initial stage of film growth. This may lead to thickness variations, increased roughness, or even discontinuities in the reflector 210, which leads to decreased performance of optical data storage disk 200, and may even result in disk 200 being non-functional.

Further, discontinuities in reflector 210 may provide places at which corrosion may preferentially occur. Thus, improved uniformity of the reflector 210 may also lead to improved environmental stability and an increased lifetime for optical data storage disk 200.

Noise reduction layer 206 may be formed over substrate 208, and as such, land areas 242 and grooves 240 of surface 208a may be replicated in noise reduction layer 206. The grooves 240 and land areas 242 are desirably replicated accurately in at least the reflector 210, and preferably in first dielectric layer 212, recording layer 214 and second dielectric layer 216 of multilayer recording stack 204. The fidelity with which the grooves 240 and land areas 242 are replicated in noise reduction layer 206 and multilayer optical stack 204 may impact the ability to accurately position beam 218 on a data track (e.g., a groove 240 or land area 242) in recording layer 214. For example, positioning of beam 218 may be more accurate if grooves 240 and land areas 242 are accurately replicated in the layers formed over substrate 208.

Figure 3:
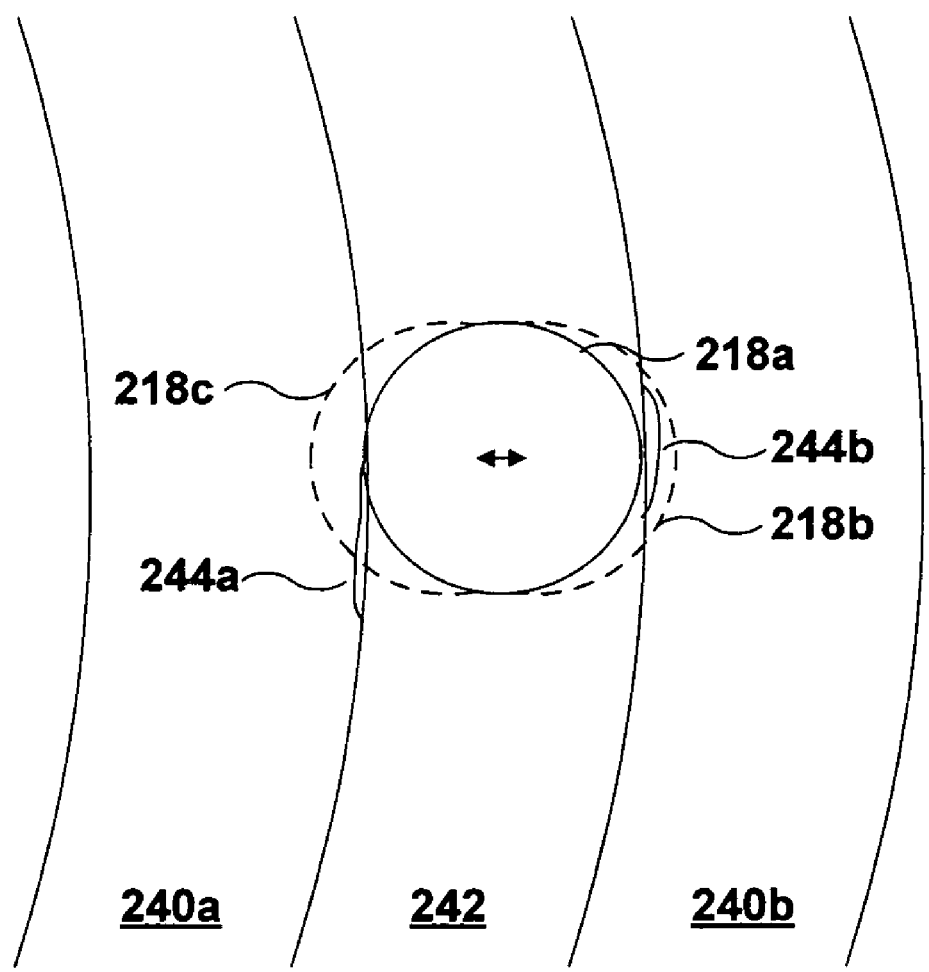
FIG. 3 is a conceptual diagram illustrating a radiation beam and an optical data storage disk including a land area and two grooves.

For example, as seen in FIG. 3, first imperfection 244a and second imperfection 244b (collectively "imperfections 244") may be formed in one of the layers formed over land area 242 and grooves 240a and 240b, or in land area 242 or grooves 240a and 240b. These imperfections 244 may be in reflector 210, for example. Regardless of the precise location of imperfections 244 within multilayer recording stack 204, land area 242 or grooves 240a and 240b, the imperfections 244 may decrease the ability to position beam 218 in the center of the track. For example, in the embodiment illustrated in FIG. 3, beam 218 is shown in three positions 218a, 218b, and 218c, as might occur when tracking over these imperfections. The degraded ability to position beam 218 when imperfections are present is due to variability of the diffracted intensities as beam 218 travels over the imperfections. Push-pull variability may be sensitive to some types of these imperfections. Ideally, push-pull variability is zero when beam 218 is reading or writing on a track.

Thus, accurately replicating the grooves 240 and land areas 242 of surface 208a, and their smoothness, in reflector 210 and the other layers of optical recording stack 204 can be very important. For example, accurately replicating the grooves 240 and land areas 242 may improve the tracking performance of beam 218.

In some embodiments, noise reduction layer 206 may increase tracking performance of beam 218. It is believed that this occurs due to increased smoothness and fidelity of the layers formed over noise reduction layer 206, including reflector 210.

Noise reduction layer 206 may comprise a material that causes the components of reflector 210 to cover a surface of noise reduction layer 206 more evenly than the component would cover the surface 208a of substrate 208. This may be accomplished by a material that interacts with components of reflector 210 and produces an interface with a lower surface energy than a substrate 208/reflector 210 interface. For example, noise reduction layer 206 may comprise a transition metal, alloys including a transition metal, oxides including a transition metal, or mixtures of these components. Preferred transition metals may include, for example, titanium (Ti) and chromium (Cr). Some preferred transition metal alloys may include, for example, Ti and another transition metal, Cr and another transition metal, or Ti and Cr. While the particular crystal structure of the noise reduction layer 206 may vary, in some preferred embodiments noise reduction layer 206 includes a polycrystalline structure.

By causing the reflector 210 to distribute more evenly over substrate 208, the noise reduction layer 206 may improve the replication of grooves 240 and land areas 242, as well as their smoothness, in reflector 210, thus improving the tracking performance of beam 218. Noise reduction layer 206, by causing reflector 210 to distribute more evenly and smoothly over substrate 208, may also improve the uniformity of reflector 210. Improving the uniformity of reflector 210 may enable reflector 210 to reflect beam 218 more consistently throughout the area of optical data storage disk 200, which may contribute to reduced jitter.

Noise reduction layer 206 may comprise a nanocrystalline material. A nanocrystalline material may refer to a material including a polycrystalline structure, where a size of individual crystallites is less than about one micron (e.g., the size of the crystallites are measured in nanometers). In some embodiments, an average crystallite size may be less than approximately 40 nm, when measured along a major dimension. In other embodiments, an average crystallite size may be less than approximately 20 nm, or even less than approximately 10 nm, when measured along a major dimension.

It is believed that a nanocrystalline noise reduction layer 206 may also improve the edge definition and shape uniformity of crystalline phase areas and amorphous phase areas of recording layer 214 when writing or erasing recording layer 214. This improvement in edge definition and shape uniformity may reduce jitter when detecting data stored in recording layer 214. For example, the improved edge definition and shape uniformity may promote the read back of more distinct transitions between crystalline phase areas 222 and amorphous phase areas 220.

In some embodiments, noise reduction layer 206 may comprise a thickness of between approximately 1 nm and approximately 20 nm. In some preferred embodiments, noise reduction layer 206 may comprise a thickness of approximately 1 nm to approximately 10 nm, more preferably approximately 5 nm to approximately 10 nm. In other preferred embodiments, noise reduction layer 206 may comprise a thickness of less than approximately 9 nm.

Figure 4:
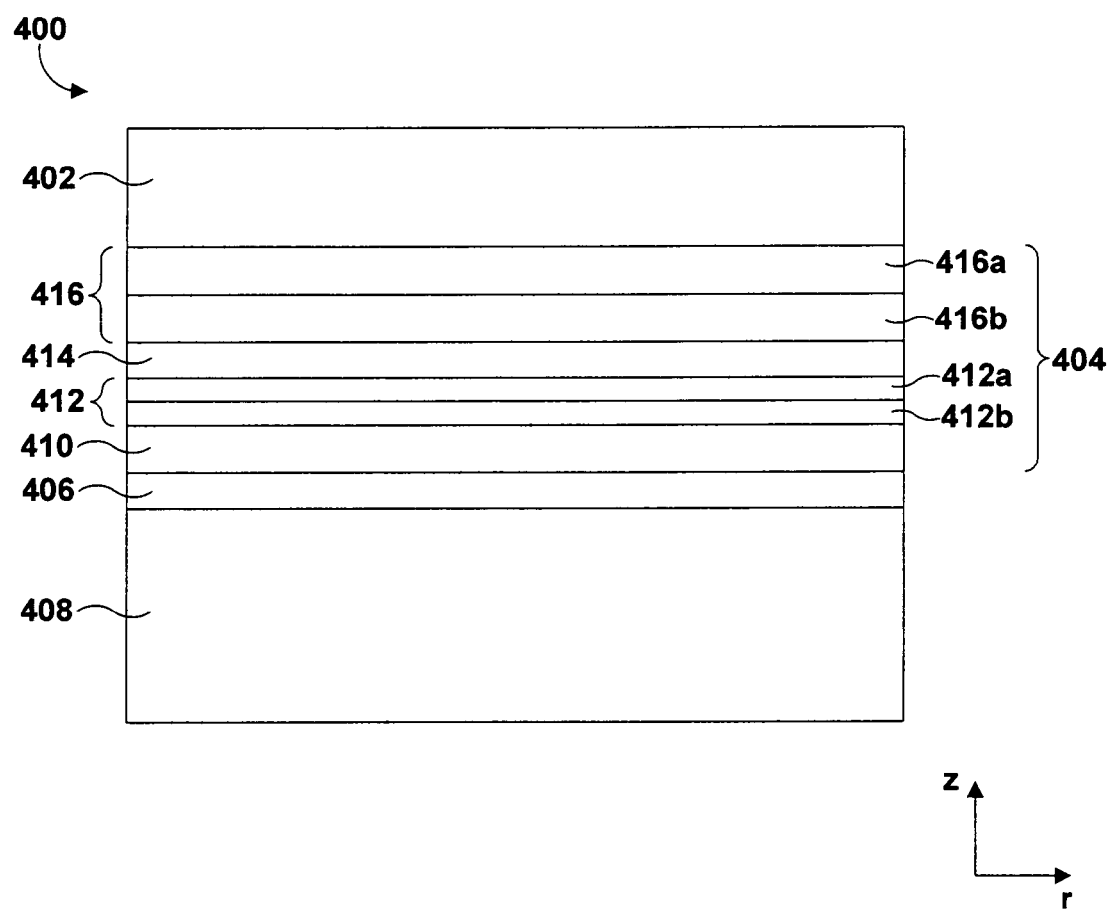
FIG. 4 is a conceptual cross-sectional view of another optical data storage disk.

FIG. 4 is a conceptual cross-sectional view of another embodiment of an optical data storage disk 400. Optical data storage disk 400 may comprise a blue disk media. Examples of blue disk media include Blu-Ray and HD-DVD, although the disk constructions described herein may only be applicable to Blu-Ray or similar type disk constructions. In some embodiments, optical data storage disk 400 includes an air incident disk, such as, for example, a Blu-Ray disk.

Optical data storage disk 400 includes a substrate 408, noise reduction layer 406, a multilayer recording stack 404, and a cover layer 402. Substrate 408 provides mechanical support for optical data storage disk 400. Substrate 408 may comprise a relatively rigid polymeric material, such as, for example, polycarbonate. Substrate 408 may comprise a variety of thicknesses depending on the standard to which disk 400 conforms. For example, in one embodiment, disk 200 conforms to the Blu-Ray disk standard, and substrate 208 comprises a thickness of approximately 1.1 mm. Substrate 400 may comprise a plurality of grooves and land areas that correspond to data tracks, as described above with respect to FIG. 2.

Noise reduction layer 406 is formed over substrate 400, and may comprise a nanocrystalline transition metal, transition metal alloy, transition metal oxide, or mixture thereof. In one preferred embodiment, noise reduction layer 406 comprises Ti. Noise reduction layer 406 may react or interact with reflector 410 to produce a more uniform reflector, and described above with reference to FIGS. 2 and 3.

Multilayer recording stack 404 is formed over noise reduction layer 406 and comprises reflector 410, first dielectric layer 412, recording layer 414 and second dielectric layer 416. Reflector 410 is formed directly on noise reduction layer 406, and comprises a reflective material, including, for example, any of the materials described above with respect to reflector 210. In some preferred embodiments, reflector 410 may comprise silver or a silver alloy including a majority of silver.

First dielectric layer 412 is formed over reflector 410. In the embodiment illustrated in FIG. 4, first dielectric layer 412 comprises first sub-layer 412a and a second sub-layer 412b. First dielectric layer 412 may provide thermal insulation between recording layer 414 and reflector 412. Further, first dielectric layer 412 may contribute to the desired optical properties of optical data storage disk 400. Forming first dielectric layer 412 with two sub-layers 412a and 412b (or in some embodiments, more than two sub-layers) may facilitate tailoring of the properties of first dielectric layer 412 to provide the desired properties to optical data storage disk 400. For example, first sub-layer 412a may comprise a material that has a desired optical property, but does not have a desired thermal conductivity. Second sub-layer 412a then may comprise a material that has a desired thermal conductivity. In this way, the combination of first sub-layer 412a and second sub-layer 412b may provide the desired properties for first dielectric layer 412.

Each of first sub-layer 412a and second sub-layer 412b may comprise a dielectric material. For example, useful dielectric materials may include silicon nitride ($Si_3N_4$), silicon oxide ($SiO_2$), zinc sulfide (ZnS), zirconium oxide ($ZrO_2$), chromium oxide (CrO, $Cr_2O_3$), aluminum nitride (AlN), aluminum oxide ($Al_2O_3$), silicon oxynitride ($SiO_xN_y$) (where x and y are positive real numbers between 0 and 2), or the like. In some embodiments, at least one of first sub-layer 412a and second sub-layer 412b may comprise a mixture of a dielectric material with another material, including another dielectric material. First sub-layer 412a and second sub-layer 412b may each comprise a thickness of up to approximately 20 nm, with the respective thicknesses chosen such that the total thickness of first dielectric layer 412 is approximately 20 nm.

Similarly, in the embodiment illustrated in FIG. 4, second dielectric layer 416 comprises a first sub-layer 416a and a second sub-layer 416. As described above, second dielectric layer 416 may contribute to desired optical properties of optical data storage disk 400, and may provide thermal insulation between cover layer 402 and recording layer 414. By forming second dielectric layer 416 with two sub-layers 416a and 416b (or in some embodiments, more than two sub-layers), the properties of second dielectric layer 416 can be tailored to provide the desired properties to optical data storage disk 400.

Each of first sub-layer 416a and second sub-layer 416b may comprise a dielectric material. For example, useful dielectric materials may include silicon nitride ($Si_3N_4$), silicon oxide ($SiO_2$), zinc sulfide (ZnS), zirconium oxide ($ZrO_2$), chromium oxide (CrO, $Cr_2O_3$), aluminum nitride (AlN), aluminum oxide ($Al_2O_3$), silicon oxynitride ($SiO_xN_y$) (where x and y are positive real numbers between 0 and 2), or the like. In some embodiments, at least one of first sub-layer 416a and second sub-layer 416b may comprise a mixture of a dielectric material with another material, including another dielectric material. First sub-layer 416a and second sub-layer 416b may each comprise a thickness of up to approximately 50 nm, with the respective thicknesses chosen such that the total thickness of second dielectric layer 416 is approximately 35 nm to approximately 65 nm.

Figure 5:
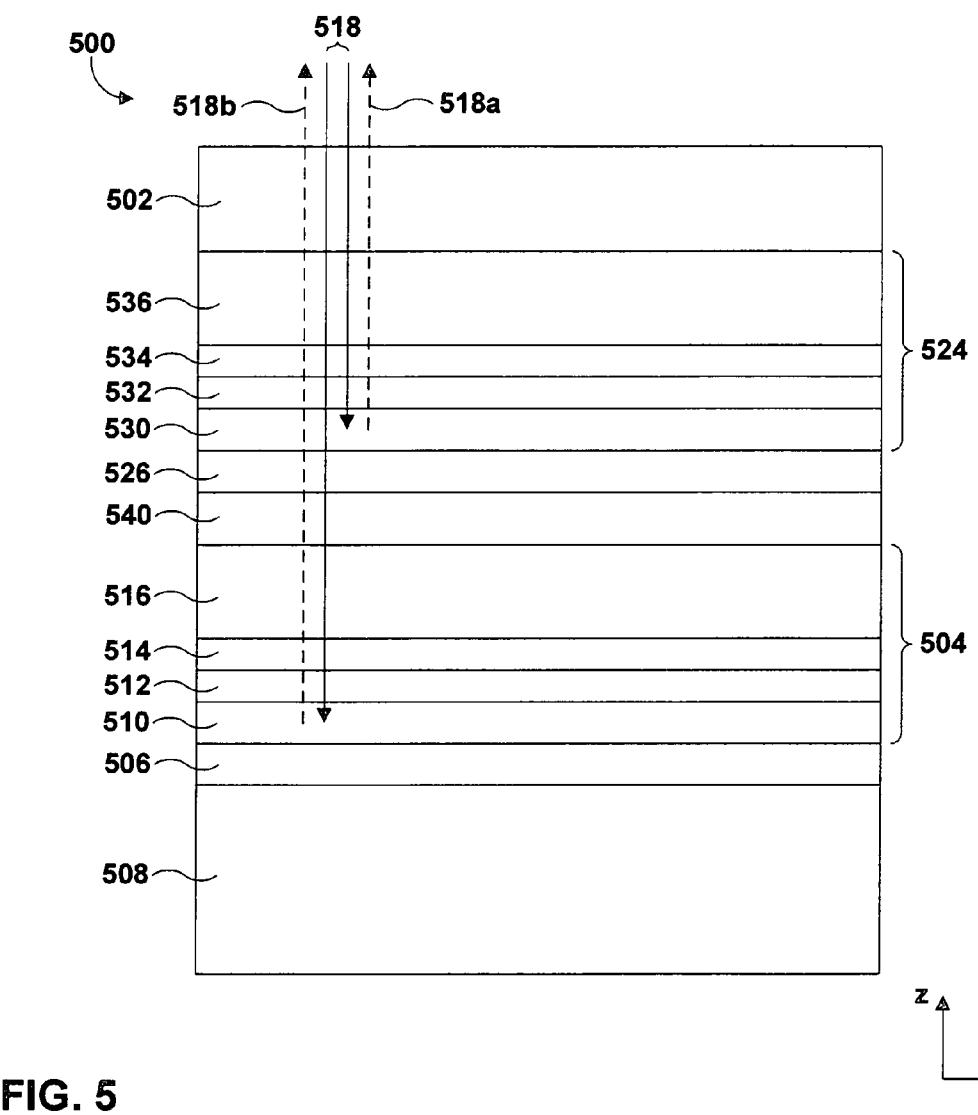
FIG. 5 is a conceptual cross-sectional view of an optical data storage disk including two multilayer optical recording stacks.

FIG. 5 is a conceptual cross-sectional view of yet another embodiment of an optical data storage disk 500. Optical data storage disk 500 again includes a substrate 508, a noise reduction layer 506 formed over substrate 508 and a cover layer 502. Each of substrate 508, noise reduction layer 506 and cover layer 502 function similarly to the corresponding structures described above, and may comprise similar components.

Optical data storage disk 500 differs from embodiments described above, however, in that disk 500 includes a first multilayer recording stack 504 and a second multilayer recording stack 524. Second multilayer recording stack 524 is formed over first multilayer recording stack 504.

First multilayer recording stack 504 may include a first reflector 510 formed directly on noise reduction layer 506, a first dielectric layer 512 formed over reflector 510, a first recording layer 514 formed over first dielectric layer 512, and a second dielectric layer 516 formed over first recording layer 514.

In the embodiment illustrated in FIG. 5, optical data storage disk 500 may include a polymeric spacer layer 540 between second dielectric layer 516 and second reflector 530. The polymeric spacer layer 540 may include a thickness between approximately 10 microns and about 50 microns. In some embodiments, polymeric spacer layer 540 may be omitted.

Optical data storage disk 500 may optionally include a second noise reduction layer 526 over which second reflector 530 is formed. Second reflector 530 may be formed directly on second noise reduction layer 526. The second noise reduction layer 526 may again comprise a nanocrystalline transition metal, such as, for example, Ti, Cr, alloys including Ti or Cr, oxides including Ti or Cr, or the like. The second noise reduction layer 526 may be included either with or without polymeric spacing layer 540.

Second multilayer recording stack 524 includes a second reflector 530 formed directly on second noise reduction layer 526, a third dielectric layer 532 formed over second reflector 530, a second recording layer 534 formed over third dielectric layer 532 and a fourth dielectric layer 536 formed over second recording layer 534.

Each of first and second recording layers 514 and 534 may comprise a phase change material that stores data in the form of amorphous and crystalline phase areas, similar to the other recording layers described herein. Beam 518 is incident on cover layer 502 and is transmitted into second multilayer recording stack 524. A first portion 518a of beam 518 is reflected by second recording stack 524, while the remainder of beam 518 is transmitted into first multilayer recording stack 504. A second portion 518b of beam 518 is reflected by first recording stack 504.

Second multilayer recording stack 524 may be designed to reflect a desired fraction of beam 518. For example, in some embodiments, such as the embodiment of FIG. 5, second recording stack 524 may reflect approximately 50% of beam 518. Assuming absorption of beam 518 is negligible, this results in approximately 50% of beam 518 being transmitted into first multilayer recording stack 504. First recording stack 504 may then be designed to reflect substantially all of beam 518 incident on it. In embodiments such as this, the first portion 518a is approximately equal to the second portion 518b of beam 518. This may be desired to provide approximately equal signals from the first and second recording layers 514, 534, respectively.

In other embodiments, optical data storage disk 500 may include more than two multilayer recording stacks. For example, in some embodiments, optical data storage disk 500 may include four multilayer recording stacks. In embodiments with more than two recording stacks, each recording stack may be designed to reflect a fraction of beam 518 such that the signal from each recording layer is approximately equal. For example, in a disk 500 including four recording stacks, the top recording stack may reflect approximately one-fourth of beam 518, the next recording stack may reflect approximately one-third of the remaining beam, the next recording stack may reflect approximately one-half of the remaining beam, and the final recording stack may reflect substantially all the remaining beam. In this way, each reflector may reflect approximately one-fourth of the original beam 518. In embodiments including more that one recording stack, a noise reduction layer may be formed under one or more of the reflectors. For example, each reflector may be formed directly on a noise reduction layer, some of the reflectors may be formed directly on a noise reduction layer, or a noise reduction layer may be only formed over the substrate, with the bottom-most reflector formed directly on the noise reduction layer.

Figure 6:
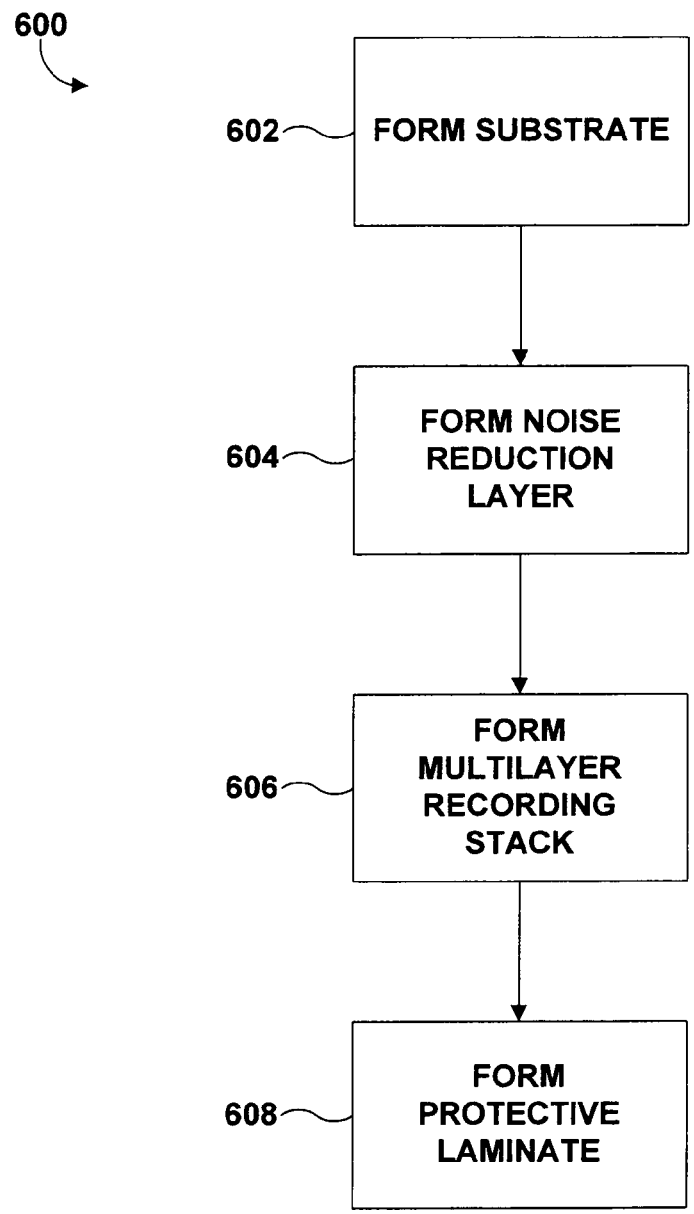
FIG. 6 is a flowchart illustrating a method of forming an optical data storage disk.

FIG. 6 is a flowchart of an exemplary method 600 of forming an optical data storage disk including a noise reduction layer. FIG. 6 will be discussed with reference to the structure of optical data storage disk 200. First, a substrate 208 is formed (602). Substrate 208 may include data tracks, such as, for example, grooves 240 and land areas 242 in a surface 208a. Substrate 208 may be formed, for example, by injection molding against a stamper that includes a negative of the desired relief pattern of grooves 240 and land areas 242.

Noise reduction layer 206 is formed (604) over substrate 208. The noise reduction layer 206 may be formed over substrate 208 with intermediate layers present between substrate 208 and noise reduction layer 206, or layer 206 may be formed directly on substrate 208. Noise reduction layer 206 may be formed over substrate 208 using a variety of techniques, including, for example, sputtering.

Next, multilayer recording stack 204 is formed (606) over noise reduction layer 206. Multilayer recording stack 204 includes a reflector 210, which is formed directly on noise reduction layer 206. Multilayer recording stack 204 also includes, in some embodiments, a first dielectric layer 212, a recording layer 214, and a second dielectric layer 216. First dielectric layer 212 may be formed over reflector 210, recording layer 214 may be formed over first dielectric layer 212, and second dielectric layer 216 may be formed over recording layer 214. In some embodiments, at least one of first dielectric layer 212 and second dielectric layer 216 may comprise a first and second dielectric sub-layer, as shown in FIG. 4. Each of the layers in multilayer recording stack 204 may be formed using appropriate techniques, such as, for example, sputtering.

Cover layer 202 is formed (608) over multilayer recording stack 204. Cover layer 202 may be formed over stack 204 by a variety of techniques, including, for example, injection molding. In some embodiments, as described above, cover layer 202 may include a plurality of sub-layers, including an optically transmissive layer, a bonding layer disposed over a first surface of the optically transmissive layer, and a hardcoat disposed over a second surface of the optically transmissive layer. In embodiments such as these, the bonding layer and hardcoat may be provided in an uncured state, and the multilayer cover layer 202 may be attached to the multilayer recording stack 204 by curing the bonding layer.

Figure 7:
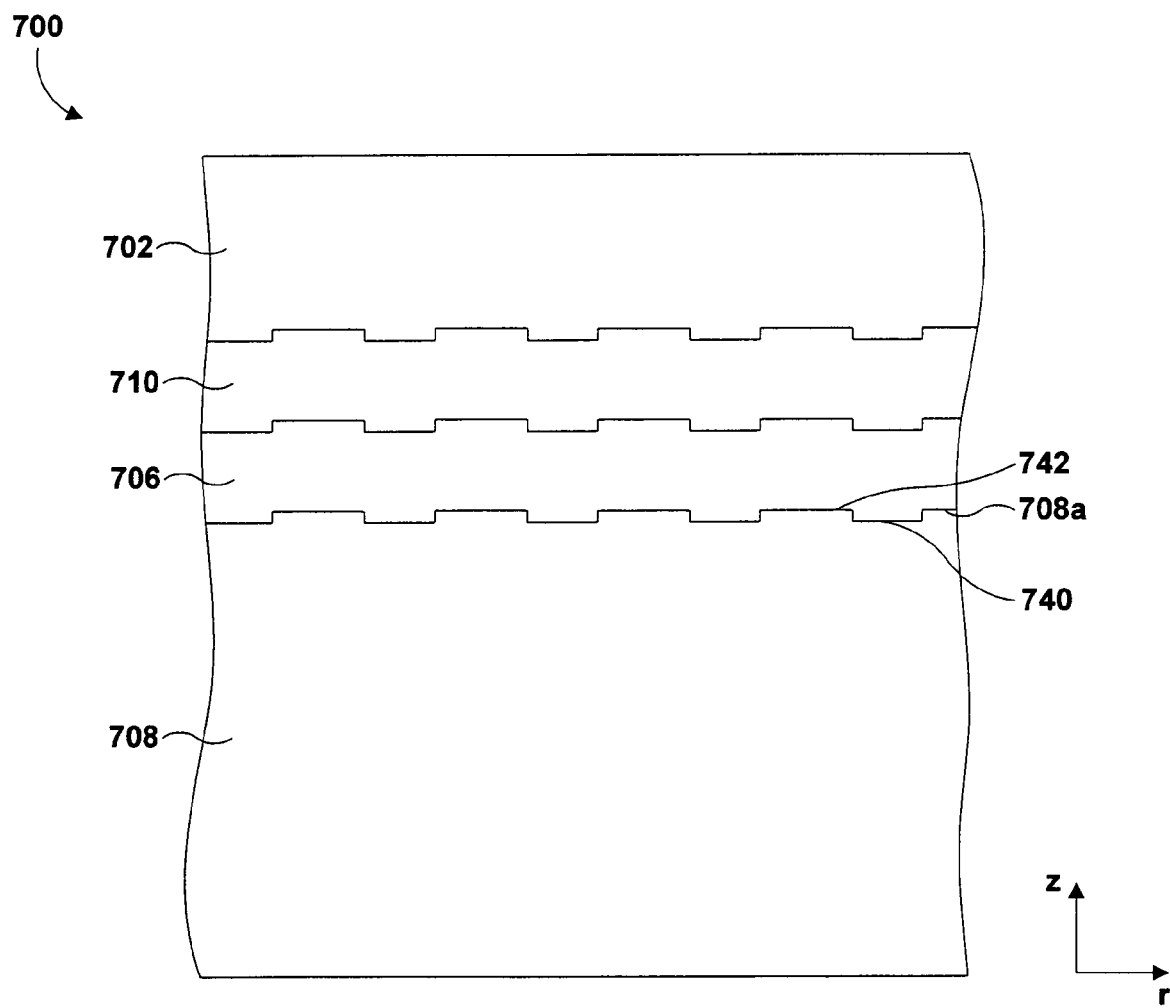
FIG. 7 is a conceptual cross-sectional view of a read only memory (ROM) optical data storage disk.

While noise reduction layers have thus far been described with respect to recordable optical data storage disks, the noise reduction layers may also be applied to read only memory (ROM) disks. For example, FIG. 7 is a conceptual cross-sectional view of a ROM optical data storage disk 700. The disk 700 may include a substrate 708 and a noise reduction layer 706 formed directly on substrate 708. In other embodiments, disk 700 may optionally include intermediate layers between substrate 708 and noise reduction layer 706 (e.g., the noise reduction layer 706 may be formed over substrate 708).

The surface 708a of substrate 708 adjacent to noise reduction layer 706 includes a plurality of pits 740 and land areas 742, which form data tracks on disk 700. As described above, the noise reduction layer 706 may improve the fidelity of the pits 740 and land areas 742 in noise reduction layer 706 and reflector 710, which is formed directly on noise reduction layer 706. In some embodiments, this may reduce jitter, may reduce the noise in the wobble signal, and may improve the tracking and positioning of a read beam compared to an optical disk in which the reflector 710 is formed directly on the substrate 708.

Disk 700 also includes a cover layer 702 formed over reflector 710. In the embodiment shown in FIG. 7, the cover layer 702 is formed directly on reflector 710, but in other embodiments, the disk may include an optional dielectric layer formed over reflector 710. In these embodiments, the cover layer 702 may be formed over the optional dielectric layer. An optical source (not shown) may detect data recorded onto disk 700 through cover layer 702.

EXAMPLE

Film stack #1 was prepared with silver alloy reflector on a SiN dielectric. A first dielectric layer including sublayers of SiN and ZnS—SiO$_2$ was formed over the silver alloy. A recording layer of GeSbTe was formed over the first dielectric layer, and a second dielectric layer including ZnS—SiO$_2$ and SiN sub-layers was formed over the recording layer. Film stack #2 was prepared with a silver alloy reflector formed over a Ti noise reduction layer. A recording layer of GeSbTe was formed over the first dielectric layer, and a second dielectric layer including ZnS—SiO$_2$ and SiN sub-layers was formed over the recording layer.

Both the film stacks were bonded with a 93 micron polycarbonate cover layer to complete disk construction. Both film structures were then initialized (the recording layer was put into a bright state) at speeds greater than 5 m/s with a power of greater than 1600 mW.

Jitter was measured on film stack #1 and film stack #2 using a Pulstec ODU 100 Blu-Ray tester (Pulstec Industrial Co., Ltd., Japan). The jitter of film stack #2 was measured to be 0.3% less than the jitter of film stack #1.

Various embodiments of the invention have been described. These and other embodiments are within the scope of the following claims.

The invention claimed is:

1. An optical data storage disk comprising:
   a substrate;
   a nanocrystalline noise reduction layer formed over the substrate;
   a reflector layer formed directly on the nanocrystalline noise reduction layer; and
   a cover layer formed over the reflector layer, wherein an optical source detects data from the disk through the cover layer.

2. The optical data storage disk of claim 1, wherein the reflector layer forms part of a multilayer recording stack, wherein the cover layer is formed over the multilayer recording stack, and wherein the optical source records data onto and detects data from the disk through the cover layer.

3. The optical data storage disk of claim 1, wherein the nanocrystalline noise reduction layer comprises a transition metal.

4. The optical data storage disk of claim 1, wherein the nanocrystalline noise reduction layer consists essentially of one or more components selected from the group consisting of Ti, Ti alloys, Cr, and Cr alloys.

5. The optical data storage disk of claim 1, wherein the nanocrystalline noise reduction layer comprises Ti.

6. The optical data storage disk of claim 1, wherein the nanocrystalline noise reduction layer comprises a thickness less than approximately 20 nm.

7. The optical data storage disk of claim 1, wherein the nanocrystalline noise reduction layer comprises a thickness between 1 nm and 10 nm.

8. The optical data storage disk of claim 1, wherein the reflector layer comprises silver.

9. The optical data storage disk of claim 1, wherein the nanocrystalline noise reduction layer is formed directly on the substrate.

10. The optical data storage disk of claim 2, wherein the multilayer recording stack further comprises a first dielectric layer formed over the reflector layer, a recording layer formed over the first dielectric layer, and a second dielectric layer formed over the recording layer.

11. The optical data storage disk of claim 10, wherein the reflector layer comprises a first reflector layer and the recording layer comprises a first recording layer, and wherein the optical data storage disk further comprises a second multilayer recording stack comprising a second reflector layer formed over the second dielectric layer, a third dielectric layer formed over the second reflector layer, a second recording layer formed over the third dielectric layer, and a fourth dielectric layer formed over the second recording layer.

12. The optical data storage disk of claim 10, wherein at least one of the first and second dielectric layers comprises a first dielectric sub-layer and a second dielectric sub-layer.

13. The optical data storage disk of claim 1, wherein the nanocrystalline noise reduction layer comprises an average crystallite size of less than approximately 40 nm.

14. An optical data storage disk comprising:
   a substrate;
   a noise reduction layer formed directly on the substrate, wherein the noise reduction layer comprises a nanocrystalline structure and wherein the noise reduction layer comprises one or more components selected from the group consisting of Ti, Ti alloys, Cr, and Cr alloys;
   a multilayer recording stack formed over the noise reduction layer, wherein the multilayer recording stack comprises a first reflector layer, and wherein the first reflector layer is formed directly on the noise reduction layer; and
   a cover layer formed over the multilayer optical stack, wherein an optical source records data onto and detects data from the disk through the cover layer.

15. A method of forming an optical data storage disk comprising:
   forming a nanocrystalline noise reduction layer over a substrate;
   forming a reflector layer directly on the nanocrystalline noise reduction layer; and
   forming a cover layer over the reflector layer.

16. The method of claim 15, wherein forming a reflector layer comprises forming a multilayer recording stack over the nanocrystalline noise reduction layer, wherein the multilayer recording stack comprises a reflector layer, and wherein the reflector layer is formed directly on the nanocrystalline noise reduction layer.

17. The method of claim 15, wherein forming a nanocrystalline noise reduction layer over a substrate comprises sputtering a transition metal directly on substrate.

18. The method of claim 15, wherein forming a nanocrystalline noise reduction layer over a substrate comprises sputtering a component selected from the group consisting of Ti, Ti alloys, Cr, Cr alloys, and combinations thereof 19. The method of claim 15, wherein forming a nanocrystalline noise reduction layer over a substrate comprises sputtering Ti directly on a substrate.

20. The optical data storage disk of claim 1, wherein the nanocrystalline noise reduction layer comprises a polycrystalline structure.

21. The method of claim 15, wherein forming a reflector layer directly on the nanocrystalline noise reduction layer comprises sputtering the reflector layer directly on the nanocrystalline noise reduction layer.

* * * * *